United States Patent [19]
Janu et al.

[11] Patent Number: 5,597,354
[45] Date of Patent: Jan. 28, 1997

[54] INDOOR AIR QUALITY CONTROL FOR CONSTANT VOLUME HEATING, VENTILATING AND AIR CONDITIONING UNITS

[75] Inventors: George J. Janu, Brookfield, Wis.; Clay G. Nesler, Ratingen, Germany

[73] Assignee: Johnson Service Company, Milwaukee, Wis.

[21] Appl. No.: 489,684

[22] Filed: Jun. 13, 1995

[51] Int. Cl.$^6$ ................................................. F24F 11/04
[52] U.S. Cl. ............................................. 454/229; 454/236
[58] Field of Search .................................... 454/228, 229, 454/234, 236

[56] References Cited

U.S. PATENT DOCUMENTS

| | | | |
|---|---|---|---|
| 4,491,061 | 1/1985 | Nishizawa et al. | 454/229 |
| 5,005,636 | 4/1991 | Haessig | 454/229 X |

FOREIGN PATENT DOCUMENTS

| | | | |
|---|---|---|---|
| 2-263025 | 10/1990 | Japan | 454/229 |
| 4-244541 | 9/1992 | Japan | 454/229 |
| 6-272919 | 9/1994 | Japan | 454/229 |

*Primary Examiner*—Harold Joyce
*Attorney, Agent, or Firm*—Harness, Dickey & Pierce, P.L.C.

[57] ABSTRACT

A system for circulating ventilating air in a space includes a supply air chamber configured for communication with a supply duct, a return air chamber configured for communication with a return air duct, and an outside air chamber configured to receive outside air from an outside air intake. The outside air chamber includes an outside air damper having a plurality of settings for varying outside air flow volume in the outside air chamber. The outside air damper establishes a predetermined relationship between each outside air damper setting and the outside air flow volume. The outside air damper establishes each setting in response to a damper control signal. The system further includes a mixed air plenum in communication with the return air chamber and the outside air chamber and a fan positioned between the mixed air plenum and the supply air chamber, the fan supplying a constant volume of air to the supply air chamber in response to a fan control signal. The system further includes a controller coupled to the outside air damper and the fan for providing the damper control signal and the fan control signal to establish a minimum outside air flow volume to the mixed air plenum.

28 Claims, 1 Drawing Sheet

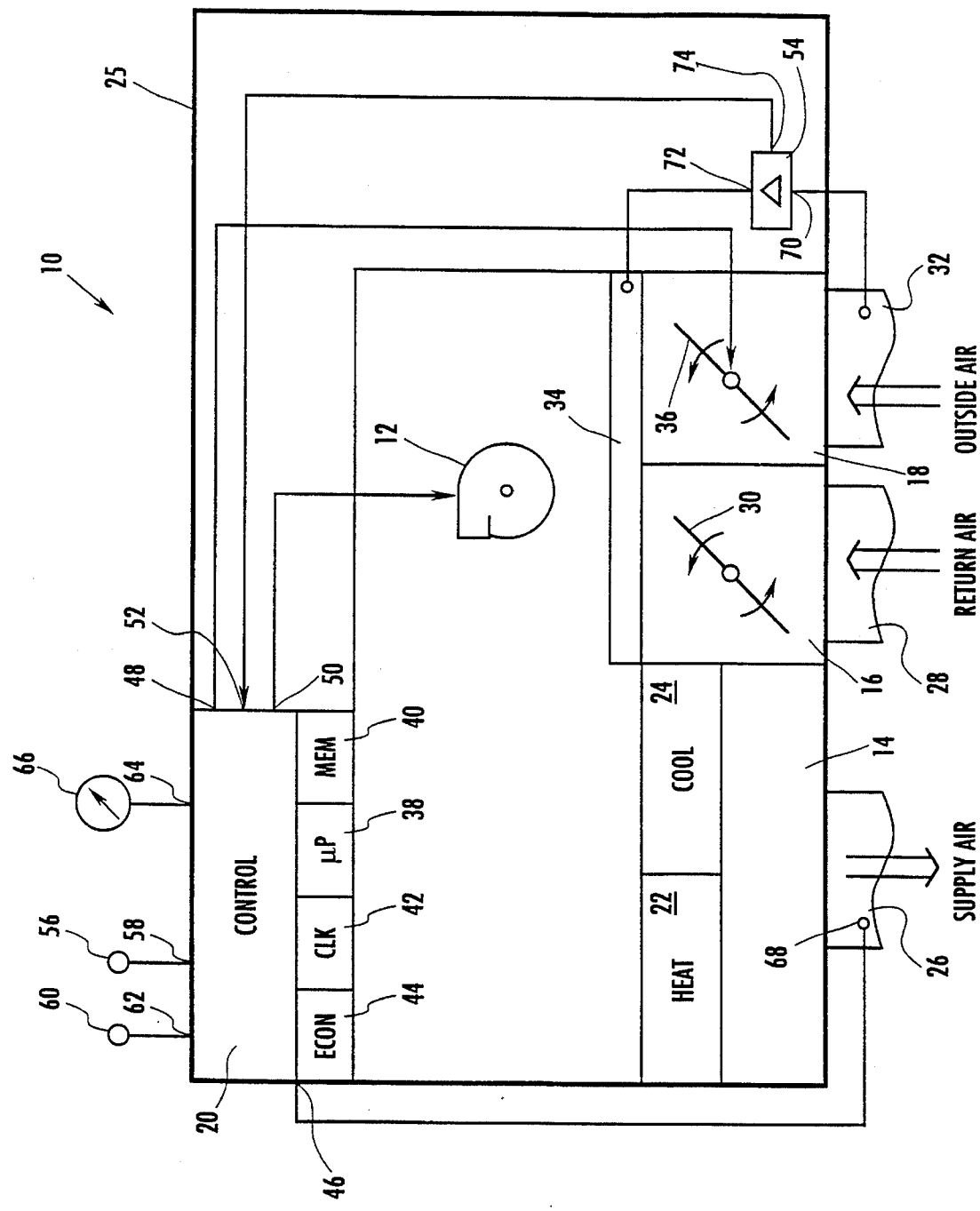

INDOOR AIR QUALITY CONTROL FOR CONSTANT VOLUME HEATING, VENTILATING AND AIR CONDITIONING UNITS

FIELD OF THE INVENTION

The present invention generally relates to a method and apparatus for controlling indoor air quality. More particularly, the present invention relates to a method and apparatus for controlling introduction of outside air into a space ventilated by a constant volume heating, ventilating and air conditioning system.

BACKGROUND OF THE INVENTION

Indoor air quality has become a topic of considerable importance. Occupants of buildings, such as office spaces, restaurants and the like, are aware of and concerned about health issues raised by indoor air quality. Moreover, indoor air quality and associated health issues have received much publicity and have even been the subject of legal action. Therefore, there is great interest in improving indoor air quality.

There are many sources of space contaminants. Humans and their activities release a wide assortment of organic and inorganic chemicals. Personal care products, photocopy machines and other office equipment release chemicals. Growth of fungal material can release spores into the air. Standing water can allow harmful bacteria to multiply. Office furniture, partitions, paint, floor coverings and cleaning materials release chemicals into the air. Cracks in below-grade walls and floors can allow radon gas to enter the building.

The outdoor air itself can be a source of unwanted contaminants. This is particularly true of buildings located in large, congested metropolitan areas, or in cases where the building's outdoor air intake is located near loading docks, garages or near the building exhaust.

Improvement or control of indoor air quality has been addressed by two methods. One method is filtration or other removal of indoor air contaminants. However, this method is expensive and may be of limited effect, particularly with respect to gaseous contaminants such as volatile organic compounds (VOCs). A second method of improving internal air quality is dilution of contaminants by introduction of fresh, outside air. This method is more feasible, both technically and economically, than filtration.

Technical standards have been written to specify minimum ventilation rates necessary to dilute indoor air contaminants and maintain acceptable indoor air quality. For example, the American Society of Heating, Refrigerating and Air-Conditioning Engineers, Inc. (ASHRAE) has issued ASHRAE Standard 62-1989 entitled "Ventilation For Acceptable Indoor Air Quality." This standard specifies two procedures for maintaining acceptable indoor air quality. The Indoor Air Quality procedure specifies control of known indoor air contaminants, similar to the filtration method described above. The Ventilation Rate Procedure specifies introduction of outside air of specified quality at specified rates to dilute indoor air contaminants.

ASHRAE Standard 62-1989 specifies supply rates of acceptable outdoor air required for acceptable indoor air quality for a variety of occupied spaces, including commercial, institutional and residential facilities. The ventilation supply rates specified in the standard are a function of factors such as the type of environment and the number of occupants. The outdoor air requirements are specified in units of cubic feet per minute (CFM) per person and specify the minimum prescribed supply rate of acceptable outdoor air required.

Conformance with the ventilation rate procedure of ASHRAE Standard 62-1989 requires supply of outside air at a controlled rate. This, in turn, requires measurement of the ventilation air flow rate so that it can be regulated to the specified rate. Therefore, closed loop control of the ventilation system is required for operation in conjunction with heating and air conditioning units.

Large scale heating, ventilating and air conditioning systems incorporate very sophisticated air flow measurement devices for monitoring supply of outside air. One common technique for measuring air flow in such systems uses one or more pitot tubes. These pitot tubes sense velocity pressure of air as it passes around the tube. The corresponding air velocity is related to the velocity pressure in a known manner. For measuring air flow, including outdoor air flow, pitot tube stations may be installed at various locations including the outdoor air intake of the heating, ventilating and air conditioning system. However, pitot tube systems are relatively expensive. To be economically feasible, an air flow measurement system, such as a pitot tube system, must be very inexpensive relative to the cost of the overall heating, ventilating and air conditioning system. Also, physical configuration of outdoor air ductwork typically does not provide space for installing pitot tubes. Also, low velocities of outdoor air make pitot tubes less accurate.

Many facilities employ low cost, self-contained "rooftop" heating, ventilating and air conditioning ("HVAC") systems, so called because the self-contained unit is typically installed on the roof of the facility. The rooftop unit includes, generally within a single structure, an air conditioning unit, a heating unit, a fan, an outdoor air intake including an outdoor air damper and a system controller. Placing such a unit into operation merely requires supply of utility service and coupling to the facility's air ducts and thermostat controls. Such a rooftop unit typically has a relatively small capacity, for example, in the range of 5–15 tons and may be used in conjunction with small commercial buildings, such as offices and fast food restaurants and the like, having a size up to, for example, 50,000 square feet.

Most smaller size rooftop units are characterized as being constant volume systems. That is, the supply fan associated with the unit runs at a generally fixed speed and supplies a constant volume of supply air to the occupied space.

Rooftop units are very cost sensitive. Design, installation and operation of such units must be inexpensive. To provide market differentiation, manufacturers seek to include a variety of operational features in such units.

Previous rooftop HVAC units made no provision for supply of outdoor air at a regulated, specified rate. One known practice for supplying outdoor air to a rooftop unit involves setting a fixed minimum position for the outdoor air intake damper, such as 10% open. The damper has a range of settings or positions, characterized as being between fully or 100% open and fully closed or 0% open. A specification of a fixed minimum damper position, as in previous rooftop HVAC units, is intended to ensure adequate outdoor air flow regulation in all modes of operation. However, such techniques have been generally ineffective at providing acceptable indoor air quality because they did not relate the damper position to the actual CFM outdoor air flow as required by the standard. Moreover, such techniques have not worked well in conjunction with other system controls, such as economizer controls.

Accordingly, there is a need in the art for a method and apparatus for controlling introduction of outside air into a constant volume system for controlling ventilation of an inside space.

SUMMARY OF THE INVENTION

The present invention provides a system for circulating ventilating air in a space, the space including a supply air duct and a return air duct. The system includes a supply air chamber configured for communication with the supply air duct and a return air chamber configured for communication with the return air duct. The system further includes an outside air chamber configured to receive outside air from an outside air intake. The outside air chamber includes an outside air damper having a plurality of settings for varying outside air flow volume in the outside air chamber. The outside air damper establishes a predetermined relationship between each outside air damper setting and the outside air flow volume. The outside air damper establishes each setting in response to a damper control signal. The system further includes a mixed air plenum in communication with the return air chamber and the outside air chamber. The system still further includes a fan positioned between the mixed air plenum and the supply air chamber. The fan supplies a constant volume of air to the supply air chamber in response to a fan control signal. The system still further includes a controller coupled to the outside air damper and the fan for providing the damper control signal and fan control signal. The controller provides the damper control signal to establish a minimum outside air flow volume to the mixed air plenum.

The invention further provides a method for controlling the amount of outside air introduced into a system for circulating ventilating air in a space. This system includes a fan for circulating the ventilating air and an outside air damper controlling the supply of outside air to the system. The outside air damper has a plurality of settings. The outside air damper establishes a predetermined relationship between each outside air damper setting and outside air flow volume. The method comprises the steps of determining a minimum outside air flow volume for the space, selecting an outside air damper setting according to the predetermined relationship to provide the minimum outside air flow volume, and adjusting the outside air damper to the selected setting.

BRIEF DESCRIPTION OF THE DRAWING

The features of the invention which are believed to be novel are set forth with particularity in the appended claims. The invention, together with further objects and advantages thereof, may best be understood by making reference to the following description taken in conjunction with the accompanying drawing, in the sole figure of which like reference numerals identify identical elements and wherein the sole figure is an operational block diagram of a heating, ventilating and air conditioning unit.

DETAILED DESCRIPTION OF THE PREFERRED EMBODIMENT

Referring now to the sole figure, it illustrates a heating, ventilating and air conditioning (HVAC) unit 10. HVAC unit 10 is preferably a self-contained, constant volume unit of the type commonly installed on the rooftops of commercial facilities. However, HVAC unit 10 may be used in conjunction with other types of facilities including residences and institutional facilities and may be installed in any location convenient for providing HVAC service to the facility. HVAC unit 10 is self-contained in that it is fully operational upon being connected with utility service, including electric power supply and natural gas for heating, and building supply and return duct work and thermostat controls.

HVAC unit 10 includes a fan 12, a supply air chamber 14, a return air chamber 16, an outside air chamber 18 and a controller 20. In addition, the HVAC unit 10 may also include a heating unit 22 and a cooling unit 24. The heating unit 22 may be of the type well known in the art which uses electrical or natural gas energy to heat air. Similarly, the cooling unit 24 may be of the type well known in the art which uses a compressor and evaporator coil to cool air. Preferably, the fan 12, supply air chamber 14, return air chamber 16, outside air chamber 18, controller 20, heating unit 22 and cooling unit 24 are contained within a single enclosure 25.

The fan 12 preferably operates at a single, fixed speed. The fan 12 may be any type of fan commonly used in conjunction with rooftop HVAC units such as HVAC unit 10. Fan 12 propels air past the heating unit 22 or the cooling unit 24 to the supply air chamber 14. A supply duct 26 is connected to the supply air chamber 14 and conveys air propelled by fan 12 throughout the facility associated with the HVAC unit 10. The supply duct 26 is not a part of the HVAC unit 10, but is a part of the facility.

Air supplied to the supply duct 26 circulates through the occupied space of the facility. This supply air may mix with air admitted to the occupied space from other sources, such as open windows or doors or from other local ventilation systems. A portion of the supply air may exit the building through such open sources as windows and doors and through local exhaust vents. The supply air circulated in the occupied space may also become contaminated with contaminants such as particulates and gaseous contaminants such as contaminants generated by people. People also exhale a predictable amount of carbon dioxide.

Air from the occupied space is returned to HVAC unit 10 by return duct 28. The return duct 28 is not a part of HVAC unit 10, but is a part of the facility. Return duct 28 is connected with the return air chamber 16. The return air chamber 16 may include a return air damper 30 which may be moved among a variety of positions or settings under the control of the controller 20 to control the amount of air passing through the return air chamber 16.

Air is also admitted to the HVAC unit 10 at outside air intake 32. The outside air intake 32 is connected to the outside air chamber 18. If the HVAC unit 10 is located outside the occupied space, such as on the roof of the facility, the outside air intake 32 may be an opening having a screen or grate for admitting air to the outside air chamber 18. In other applications, the outside air intake 32 may be connected to the outside space using appropriate duct work.

The return air chamber 16 and the outside air chamber 18 are coupled together in communication with a mixed air plenum 34. Return air from the occupied space which has become contaminated is mixed with outside air in the mixed air plenum 34, diluting the contaminants. The fan 12 draws air from the mixed air plenum 34 and propels the air to the supply air chamber 14.

The outside air chamber 18 includes an outside air damper 36. The outside air damper 36 may include one or more blades or vanes. The damper, including the blades or vanes, may be rotated or otherwise moved to selectively permit or block the passage of air through the outside air chamber 18. Thus, the outside air damper 36 has a plurality of settings or positions for varying outside air flow volume in the outside air chamber 18.

In a constant volume system such as HVAC unit 10, supply air volume is maintained constant by the fan 12. Therefore, for any given position of the outdoor air damper 36, the vacuum established by the fan 12 in the mixed air plenum 34 is constant. As a result, the pressure differential across the outdoor air damper 36 is constant. Outdoor air flow through the outdoor air chamber 18 depends only on the position of the outdoor air damper 36, with exceptions related to supply and return duct resistance and wind effects, to be discussed below.

Since outdoor air flow depends only on outdoor air damper position, for each model of rooftop HVAC unit, such as HVAC unit 10, actual outdoor air damper characteristics may be experimentally determined. The outside air damper 36 establishes a predetermined relationship between each outside air damper setting or position and outside air flow volume. This predetermined relationship, outdoor air flow as a function of damper position, once determined, may be programmed into or otherwise used by the controller 20.

The controller 20 preferably includes a processor 38 and a memory 40. The controller may further include a real time clock 42 to permit operation of the HVAC unit 10 according to a schedule of times and operating conditions. The controller 20 may also include an economizer 44 for controlling the admission of outside air during heating and cooling.

The processor 38 operates in response to instructions and data stored in the memory 40. The controller 20 including the processor 38 controls the operation of the HVAC unit 10, including operation of the fan 12, the heating unit 22 and the cooling unit 24. The controller 20 including the processor 38 also controls operation of the return air damper 30 and the outside air damper 36.

The controller 20 includes inputs and outputs for controlling the HVAC unit 10. The controller 20 includes an initialization input 46 configured to receive an initialization signal. The initialization signal has a plurality of values corresponding to an associated plurality of supply and return, to be discussed below. The controller 20 further includes a damper control output 48 for providing a damper control signal to the outside air damper 36 and the return air damper 30. The controller 20 still further includes a fan control output 50 for providing a fan control signal to the fan 12. The controller 20 still further includes a pressure differential input 52 for receiving a pressure differential signal from a pressure differential detector 54. The controller 20 still further includes an outside air contamination input 58 for receiving an outside air contamination signal from an outside air contamination detector 56 and an inside air contamination input 62 for receiving an inside air contamination signal from an inside air contamination detector 60. The controller 20 still further includes an air flow set point input 64 for receiving an air flow set point signal.

Preferably, the memory 40 stores data defining the predetermined relationship between each outside air damper setting or position and the outside air flow volume. The controller 20 receives at the air flow set point input 64 a minimum outside air flow set point signal. The minimum outside air flow set point signal corresponds to the minimum outside air flow volume necessary to maintain satisfactory internal air quality, for example, in accordance with ASHRAE Standard 62-1989. Since the air flow requirements established by ASHRAE Standard 62-1989 are specified in terms of facility type and occupancy, the minimum outside air flow set point signal will vary depending on facility type and expected occupancy of the facility. The minimum outside air flow set point signal may be produced by a minimum air flow set point controller 66, which may take the form of a dial or gauge or other apparatus for manually selecting an expected occupancy for the space and producing the minimum outside air flow set point signal corresponding to the selected expected occupancy. In place of the minimum air flow set point controller 66, any apparatus could be used, including an electrical jumper or other device which is configured at the time of installation of the HVAC unit 10 to provide a minimum air flow set point signal corresponding to the expected occupancy of the occupied space. The minimum outside air flow setpoint can be also time-scheduled if the expected occupancy varies in time.

In response to the signal received at the air flow set point input 64, the controller 20 determines the position or setting of the outside air damper 36 appropriate to establish the minimum outside air flow volume. The controller may determine the appropriate damper position using any one of a number of methods or apparatuses. For example, if the minimum air flow set point controller 66 is included, the controller 20 may respond directly to the signal produced by this controller 66. Alternatively, the controller 20 may include an operational amplifier (not shown) which implements a feedback control loop to allow a remote and/or digital adjustment of the minimum outdoor air flow. Still further, the controller 20 including the processor 38 could implement a polynomial curve-fit procedure to calculate required outdoor air damper position for the specified outdoor air flow volume. Still further, the processor 38 could implement a fuzzy logic algorithm to calculate outdoor air damper position for the specified outdoor air flow volume. Any of these techniques for determining outdoor air damper position may be used. An individual technique may be chosen based on the relative cost and sophistication of the HVAC unit 10.

As noted above, the economizer 44 controls the admission of outside air during heating and cooling to improve the energy efficiency of the HVAC system 10. The economizer 44 thus controls the position of the outside air damper 36. Preferably, the outdoor air damper position necessary for the specified minimum outdoor air flow for ventilation overrides the minimum outdoor air damper position determined by the economizer 44.

As noted, HVAC unit 10 is preferably a constant volume system. That is, for any outdoor air damper position, the mixed air plenum vacuum is constant. Therefore, an outdoor air damper characteristic curve or predetermined relationship of outdoor air flow as a function of damper position can be experimentally determined and used by the controller 20. However, the actual supply duct resistance associated with the supply duct 26 and actual return duct resistance associated with return duct 28 and each individual rooftop unit installation can slightly change the mixed air plenum vacuum and thereby shift the damper characteristic. In order to compensate for this shift, a family of several outdoor air damper characteristic curves or relationships may be experimentally determined for each rooftop unit model. For example, a family of curves or relationships could consist of three or four such curves or relationships, each curve or relationship being associated with a particular supply and/or return duct resistance or mixed air plenum vacuum. Data corresponding to this family of curves may be stored in the memory 40.

To accommodate the differing supply and return duct resistances and associated families of curves or relationships, the controller 20 receives an initialization signal at the initialization input 46. The initialization signal is produced by a duct resistance detector 68, located in the supply duct 26 or a similar duct resistance detector (not shown) located in return air duct 28. Alternatively, the initialization signal may be produced in response to a detector which detects the actual mixed air plenum vacuum. The initialization signal may have one of a plurality of values corresponding to an associated plurality of supply and return duct resistances. In response to the initialization signal, the controller 20 determines which curve or relationship between outside air damper setting and outside air flow volume is appropriate. Preferably, the memory 40 stores data which define the predetermined relationship between each outdoor air damper setting and the outside air flow volume. The data are organized in sets, each set corresponding to a respective supply duct resistance. In response to the initialization signal, the controller 20 selects a set of data for providing the damper control signal to the outside air damper 36.

Alternatively, the initialization signal may be provided by a switch or jumper to provide the actual supply duct resistance. For example, the jumper or switch may have three positions, each position representing alternative outdoor air damper characteristic curves, experimentally determined for three levels of supply duct resistance. At the time when HVAC unit 10 is installed, the installer may read the actual mixed air plenum vacuum that reflects the supply and return duct resistance and select the appropriate switch or jumper position. The ability to accommodate supply and return duct resistances provides an additional operational feature.

Similar to changes in mixed air plenum vacuum or supply or return duct resistance, wind effects can cause a change in the pressure differential across the outdoor air damper 36. This can shift the outdoor air damper characteristic curve or relationship. That is, wind effects can change the outdoor air flow obtained in a constant volume system from a given damper position. This is particularly true in the case of an HVAC unit such as HVAC unit 10 which is installed on a rooftop, exposed to the wind.

The pressure differential detector 54 may be used to provide correction of the outdoor air damper characteristic curve for wind effects and supply duct resistance. The pressure differential detector 54 has a first input 70 connected with the upstream side of the outdoor air damper 36, adjacent the outdoor air intake 32. The pressure differential detector 54 has a second input connected with the mixed air plenum 34. The pressure differential detector 54 has an output 74 coupled to the pressure differential input 52 of the controller 20. The pressure differential detector 54 produces a signal at the output 74 in response to the air pressure differential detected between the first input 70 and the second input 72.

Using the pressure differential detector 54, the outdoor air flow can be calculated according to the following equation:

$$\text{OUTDOOR AIR FLOW} = 4005 \times \text{AREA} \times \sqrt{\Delta P} \quad \text{[Eq. 1]}$$

where OUTDOOR AIR FLOW is measured in cubic feet per minute, AREA represents the flow through area of the outdoor air damper 36 in square feet and $\Delta P$ represents the pressure differential detected by pressure differential detector 54, in inches of water gauge. The flow through area of the outdoor air damper 36 is experimentally determined for each model of rooftop unit, such as HVAC unit 10, to establish the following relationship:

$$\text{OD Position} = f(\text{AREA}) \quad \text{[Eq. 2]}$$

where OD Position represents the outdoor damper position as a percent of fully opened position and AREA is the flow through area of the outdoor air damper 36 in square feet and f is the experimentally determined relationship.

Then, for a required minimum outdoor air flow set point, $\text{FLOW}_{ODA}$, the minimum outdoor air damper position is calculated as:

$$\text{OD Position} = f\left( \frac{\text{FLOW}_{ODA}}{4005 \times \sqrt{\Delta P}} \right) \quad \text{[Eq. 3]}$$

This minimum outdoor air damper position calculation may be implemented in the controller 20 using the processor 38, for example to perform a polynomial curve-fit of the damper characteristic and the calculation or using a fuzzy logic algorithm which determines required outdoor air damper position from outdoor air flow set point and the pressure differential across the outdoor air damper 36. Alternatively, the controller 20 may include an operational amplifier (not shown) for implementation of the damper characteristic and this calculation. Implementation of the hardware necessary to perform these calculations is well within the purview of those ordinarily skilled in the art. Accommodation of both wind effects and variable supply duct resistance provides an additional operational feature.

In applications where the HVAC unit 10 provides ventilating air to a space with variable but predictable occupancy, the controller 20 may include real time clock 42 to permit time scheduling of minimum outdoor air flow set point to reflect the expected occupancy during the day and during each day of the week, according to an occupancy profile. Facilities which could benefit from this include classrooms, offices, residences, etc. Implementation of time scheduling could save energy for heating or cooling, as compared with using a fixed minimum outdoor air flow set point determined for maximum expected occupancy. To implement this, the memory 40 would store an expected occupancy schedule which includes a list of times and an associated list of expected occupancies of the space. The processor 38, operating in response to the real time clock 42 and the schedule stored in the memory 40, determines the expected occupancy of the space at a given time and determines the minimum outside air flow volume in response to the expected occupancy of the space. A controller 20 provides the damper control signal to the outdoor air damper 36 to establish the minimum outside air flow volume determined by the processor 38. The ability to vary minimum outside air flow according to a time schedule provides an additional operational feature.

At times, the outdoor air is temporarily contaminated and should not be used for ventilation. ASHRAE Standard 62-1989 specifies that "the amount of outdoor air may be reduced during periods of high contaminant levels, such as those generated by rush hour traffic." Another typical cause of high contamination levels of outdoor air could be a truck idling in a loading dock that is situated near the outside air intake 32.

In these situations, the outside air contamination detector 56 may be included with the HVAC unit 10 for detecting outside air contamination. The outside air contamination detector 56 produces an outside air contamination signal. In response to this outside air contamination signal, the controller 20 determines that outside air is contaminated and should not be used for ventilation. In response to this determination, a controller 20 overrides the minimum outdoor air damper position previously determined and maintains the outdoor air damper 36 substantially closed. One example of an appropriate outside air contamination detector is a low cost, tin oxide ("Taguchi") sensor. These sensors provide an approximate air contamination measurement which is not specific to any particular contaminant, but sensitive to a "total VOC concentration." Alternatively, more sophisticated and expensive sensors, calibrated to particular contaminants, may be used as the outside air contamination detector 56. The ability to block outside air flow in response to contamination of outside air provides an additional operational feature.

An additional feature may be provided by the inside air contamination detector 60. This detector 60 is preferably located within the occupied space of the facility. The detector 60 is sensitive to concentration of one or more contaminants or contaminant indicators such as carbon dioxide. The detector 60 produces an inside air contamination signal, received at the inside air contamination input 62 of the controller 20. If the inside air contamination signal indicates that concentration of one or more contaminants exceeds a predetermined threshold, the controller 20 overrides the minimum outdoor air damper position previously determined to provide minimum outdoor air flow for expected occupancy. In this case, the outdoor air damper 36 is opened wider to increase outdoor air flow to dilute the space contaminant concentration. For example, sensed carbon dioxide concentration could be compared to a set point of approximately 800 parts per million carbon dioxide. This is below the maximum carbon dioxide concentration allowed by ASHRAE Standard 62-1989, which is 1,000 parts per million. Preferably, the controller 20 only increases outdoor air damper position, not decreases it. Variation of outside air damper position in response to inside air contamination provides an additional operational feature.

As can be seen from the foregoing, there is provided a method and apparatus for controlling indoor air quality in a space ventilated by a constant volume heating, ventilating and air conditioning system. This is achieved by controlling outdoor air damper position only, and does not require sophisticated or expensive air flow measurement apparatus. Thus, the cost of implementing the method or apparatus is small, which is important in cost-sensitive rooftop HVAC units. In addition, several features which may be included as performance options are also provided. These features include adaptation to installed supply and/or return duct resistance, adaptation to wind effects, time scheduling of minimum outdoor air flow for expected occupancy, maintaining outdoor air damper closed in response to bad outdoor air quality, and increase of minimum outdoor air flow for expected occupancy in response to high inside contaminant concentration.

While particular embodiments of the present invention have been shown and described, modifications may be made, and it is therefore intended in the appended claims to cover all such changes and modifications which fall within the true spirit and scope of the invention.

We claim:

1. A system for circulating ventilating air in a space, the space including a supply air duct and a return air duct, the system comprising:

a supply air chamber configured for communication with the supply air duct;

a return air chamber configured for communication with the return air duct;

an outside air chamber configured to receive outside air from an outside air intake, the outside air chamber including an outside air damper having a plurality of settings for varying outside air flow volume in the outside air chamber, the outside air damper establishing a predetermined relationship between each outside air damper setting and the outside air flow volume, the outside air damper establishing each setting in response to a damper control signal;

a mixed air plenum in communication with the return air chamber and the outside air chamber;

a fan positioned between the mixed air plenum and the supply air chamber, the fan supplying a constant volume of air to the supply air chamber in response to a fan control signal; and a controller coupled to the outside air damper and the fan for providing the damper control signal and the fan control signal, the controller providing the damper control signal to establish a minimum outside air flow volume to the mixed air plenum, the controller including:

an initialization input configured to receive an initialization signal, the initialization signal having one value of a plurality of values corresponding to an associated plurality of predetermined duct resistances, the one value corresponding to the minimum outside air flow volume; and a memory for storing data defining the predetermined relationship between each outside air damper setting and the outside air flow volume, the data being organized in sets, each respective set corresponding to a respective duct resistance, the controller selecting a set of data in response to the initialization signal, the controller being responsive to the selected set of data for providing the damper control signal.

2. A system as recited in claim 1 wherein the controller includes a processor coupled to the memory, the processor receiving the stored data and calculating an outside air damper position to establish the minimum outside air flow volume, the controller providing the damper control signal in response to the calculated outside air damper position.

3. A system as recited in claim 1 wherein the plurality of predetermined duct resistances includes a plurality of supply duct resistances.

4. A system as recited in claim 1 wherein the plurality of predetermined duct resistances includes a plurality of return duct resistances.

5. A system as recited in claim 1 further comprising a pressure differential detector coupled between the mixed air plenum and the outside air intake, the pressure differential detector producing a pressure differential signal, and wherein the controller includes a pressure differential input coupled to the pressure differential detector for receiving the pressure differential signal, the controller providing the damper control signal in response to the pressure differential signal.

6. A system as recited in claim 5 wherein the pressure differential signal is proportional to the pressure differential between the mixed air plenum and the outside air intake.

7. A system as recited in claim 1 wherein the memory further stores an expected occupancy schedule, the schedule including a list of times and an associated list of expected occupancies of the space, and wherein the controller further includes a clock and a processor, the processor being coupled to the memory and the clock, the processor receiving the schedule from the memory and a real time clock signal from the clock, the processor determining an expected occupancy of the space in response to the schedule and the real time clock signal, the processor determining the minimum outside air flow volume in response to the expected occupancy of the space.

8. A system as recited in claim 1 further comprising an outside air contamination detector coupled to the controller for providing an outside air contamination signal to the controller, the outside air contamination signal being proportional to a detected level of an outside air contaminant, and wherein the controller provides the damper control signal to establish the outside air damper in a substantially closed position when the outside air contamination signal exceeds a predetermined threshold.

9. A system as recited in claim 1 further comprising an inside air contamination detector coupled to the controller for providing an inside air contamination signal to the controller, the inside air contamination signal being proportional to a detected level of one or more inside air contaminants or contaminant indicators and wherein the controller provides the damper control signal to establish the outside air damper in a more open position when the inside air contamination signal exceeds a predetermined threshold.

10. A system as recited in claim 9 wherein carbon dioxide is used as an indicator of inside air contaminants.

11. A method for controlling the amount of outside air introduced into a system for circulating ventilating air in a space, the system including a fan for circulating the ventilating air and an outside air damper for controlling supply of outside air to the system, the outside air damper having a plurality of settings, the outside air damper establishing a predetermined relationship between each outside air damper setting and outside air flow volume, the method comprising the steps of:

determining a minimum outside air flow volume for the space;

selecting an outside air damper setting according to the predetermined relationship to provide the minimum outside air flow volume;

adjusting the outside air damper to the selected setting; and wherein the system further includes a supply duct for communicating supply air from the fan to the space, the method further comprising the steps of determining a supply duct resistance associated with the supply duct and adjusting the outside air damper position in response to the supply duct resistance to maintain the minimum outside air flow.

12. A method as recited in claim 11 further comprising the step of determining an occupancy of the space and wherein the minimum outside air flow volume is determined in response to the determined occupancy of the space.

13. A method as recited in claim 12 wherein the step of determining the occupancy comprises determining a maximum expected occupancy.

14. A method as recited in claim 11 further comprising the step of determining an expected occupancy schedule of the space and wherein the minimum outside air flow volume is determined in response to the determined expected occupancy schedule.

15. A method as recited in claim 11 wherein the system includes a mixed air plenum and wherein the step of determining the supply duct resistance comprises the step of measuring a mixed air plenum vacuum.

16. A method as recited in claim 11 further comprising the steps of determining an outside air contaminant level and maintaining the outside air damper at a substantially closed setting when the outside air contaminant level exceeds a predetermined outside air contaminant threshold.

17. A method as recited in claim 11 further comprising the steps of determining a level of a predetermined contaminant inside the space and adjusting the outside air damper setting to provide more than the determined minimum outside air flow volume while the level of the predetermined contaminant exceeds a predetermined inside air contaminant threshold.

18. A method as recited in claim 17 wherein carbon dioxide is used as an indicator of inside air contaminants.

19. A method for controlling the amount of outside air introduced into a system for circulating ventilating air in a space, the system including a fan for circulating the ventilating air and an outside air damper for controlling supply of outside air to the system, the outside air damper having a plurality of settings, the outside air damper establishing a predetermined relationship between each outside air damper setting and outside air flow volume, the method comprising the steps of:

determining a minimum outside air flow volume for the space;

selecting an outside air damper setting according to the predetermined relationship to provide the minimum outside air flow volume; and adjusting the outside air damper to the selected setting wherein the method further includes a return duct for communicating return air from the space to the fan, the method further comprising the steps of determining a return duct resistance associated with the return duct and adjusting the outside air damper position in response to the return duct resistance to maintain the minimum outside air flow.

20. A method as recited in claim 19 wherein the system includes a mixed air plenum and wherein the step of determining the return duct resistance comprises the step of measuring a mixed air plenum vacuum.

21. A method for controlling the amount of outside air introduced into a system for circulating ventilating air in a space, the system including a fan for circulating the ventilating air and an outside air damper for controlling supply of outside air to the system, the outside air damper having a plurality of settings, the outside air damper establishing a predetermined relationship between each outside air damper setting and outside air flow volume, the method comprising the steps of:

determining a minimum outside air flow volume for the space;

selecting an outside air damper setting according to the predetermined relationship to provide the minimum outside air flow volume;

adjusting the outside air damper to the selected setting; and further comprising the steps of detecting a wind velocity characteristic of the outside air and selecting an outside air damper setting according to the detected wind velocity characteristic.

22. A method as recited in claim 21 wherein the wind characteristic includes an air pressure differential created across the outside air damper and wherein the method further comprises the step of selecting the outside air damper setting responsive to the detected air pressure differential.

23. A system which circulates ventilating air in a space, the space including a supply air duct and a return air duct, the system comprising:

a supply air chamber configured for communication with the supply air duct, a return air chamber configured for communication with the return air duct, and an outside air chamber configured to receive outside air from an outside air intake;

an outside air damper having a plurality of settings for varying outside air flow volume in the outside air chamber, the outside air damper establishing a predetermined relationship between each outside air damper setting and the outside air flow volume, the outside air damper establishing each setting in response to a damper control signal;

a mixed air plenum in communication with the return air chamber and the outside air chamber, air within the mixed air plenum having a mixed air plenum pressure;

a pressure detector coupled to the mixed air plenum, the pressure differential detector producing a pressure signal corresponding to the mixed air plenum pressure;

a fan positioned between the mixed air plenum and the supply air chamber for supplying a constant volume of air to the supply air chamber; and a controller having a memory for storing data defining the predetermined relationship between each outside air damper setting and the outside air flow volume, a pressure input coupled to the pressure detector for receiving the pressure signal, an initialization input configured to receive an initialization signal corresponding to a minimum outside air flow volume to the mixed air plenum, and a processor coupled to the memory, the processor receiving the stored data from the memory and calculating an outside air damper position in response to the pressure signal and the initialization signal, the processor providing the damper control signal in response to the calculated outside air damper position to establish an outside air damper setting corresponding to the minimum outside air flow volume.

24. A system as recited in claim 23 wherein the memory further stores an expected occupancy schedule, the schedule including a list of times and an associated list of expected occupancies of the space, and wherein the controller further includes a clock coupled to the processor, the processor receiving the schedule from the memory and a real time clock signal from the clock, the processor determining an expected occupancy of the space in response to the schedule and the real time clock signal, the processor calculating the outside air damper position in response to the expected occupancy of the space.

25. A system as recited in claim 23 further comprising an outside air contamination detector coupled to the controller for providing an outside air contamination signal to the controller, the outside air contamination signal being proportional to a detected level of an outside air contaminant, and wherein the controller provides the damper control signal to establish the outside air damper in a substantially closed position when the outside air contamination signal exceeds a predetermined threshold.

26. A system as recited in claim 23 further comprising an inside air contamination detector coupled to the controller for providing an inside air contamination signal to the controller, the inside air contamination signal being proportional to a detected level of one or more inside air contaminants or contaminant indicators and wherein the controller provides the damper control signal to establish the outside air damper in a more open position when the inside air contamination signal exceeds a predetermined threshold.

27. A system as recited in claim 26 wherein carbon dioxide is used as an indicator of inside air contaminants.

28. A system as recited in claim 23 wherein the pressure detector comprises a pressure differential detector coupled between the mixed air plenum and the outside air intake, the pressure differential detector producing the pressure signal, the pressure signal proportional to the pressure differential between the mixed air plenum and the outside air intake.

* * * * *